US011996697B2

(12) United States Patent
Chakrabartty et al.

(10) Patent No.: US 11,996,697 B2
(45) Date of Patent: May 28, 2024

(54) AUTONOMOUS VEHICLE SUPPORT USING HYBRID-POWERED EMBEDDED SENSORS

(71) Applicants: Shantanu Chakrabartty, St. Louis, MO (US); Kenji Aono, St. Louis, MO (US); Sri Harsha Kondapalli, St. Louis, MO (US); Owen Pochettino, St. Louis, MO (US)

(72) Inventors: Shantanu Chakrabartty, St. Louis, MO (US); Kenji Aono, St. Louis, MO (US); Sri Harsha Kondapalli, St. Louis, MO (US); Owen Pochettino, St. Louis, MO (US)

(73) Assignee: Washington University, St. Louis, MO (US)

( * ) Notice: Subject to any disclaimer, the term of this patent is extended or adjusted under 35 U.S.C. 154(b) by 739 days.

(21) Appl. No.: 16/810,837

(22) Filed: Mar. 5, 2020

(65) Prior Publication Data

US 2020/0287411 A1 Sep. 10, 2020

Related U.S. Application Data

(60) Provisional application No. 62/813,998, filed on Mar. 5, 2019.

(51) Int. Cl.
*H02J 50/00* (2016.01)
*B60W 20/20* (2016.01)
*B60W 20/50* (2016.01)
*H02J 50/27* (2016.01)
*H02J 50/80* (2016.01)
*H04W 4/38* (2018.01)
*H04W 4/44* (2018.01)
*H04W 4/80* (2018.01)

(52) U.S. Cl.
CPC ........... *H02J 50/001* (2020.01); *B60W 20/20* (2013.01); *B60W 20/50* (2013.01); *H02J 50/27* (2016.02); *H02J 50/80* (2016.02); *H04W 4/38* (2018.02); *H04W 4/44* (2018.02); *H04W 4/80* (2018.02)

(58) Field of Classification Search
CPC .. H02J 50/20; H02J 50/23; H02J 50/27; H02J 50/001; H04W 4/40–48
See application file for complete search history.

(56) References Cited

U.S. PATENT DOCUMENTS

| | | | | |
|---|---|---|---|---|
| 7,768,406 B1 * | 8/2010 | Peach | ..................... | H02J 50/20 340/645 |
| 2013/0314061 A1* | 11/2013 | Forghani-zadeh | ........................... | H02M 3/1588 323/271 |
| 2015/0254484 A1* | 9/2015 | Jurisch | ............... | G06K 7/10415 340/10.1 |

FOREIGN PATENT DOCUMENTS

| | | | | | |
|---|---|---|---|---|---|
| CN | 106768087 A | * | 5/2017 | | |
| JP | 2019067353 A | * | 4/2019 | ............ | G01C 21/28 |
| KR | 20080074640 A | * | 8/2008 | | |

OTHER PUBLICATIONS

Machine translation of KR-20080074640-A (Year: 2022).*
Machine translation of CN-106768087-A (Year: 2022).*
Machine translation of JP-2019067353-A (Year: 2022).*

* cited by examiner

*Primary Examiner* — David V Henze-Gongola

(57) ABSTRACT

A hybrid-powered sensing device is disclosed that includes a power source coupled to a sensing module via an RF-triggered load switching module.

16 Claims, 19 Drawing Sheets
(13 of 19 Drawing Sheet(s) Filed in Color)

KEY DEVICE SPECIFICATIONS

| Parameter | I2V Prototype |
|---|---|
| PCB Area (cm$^2$) | 22.15 |
| Transmission Power (dBm) | 8 |
| Transmission Distance (m) | >10 |
| Lifetime (yrs) | >20 |
| Trigger Distance (m) | 1 |
| Trigger Latency (ms) | 75 |
| Battery Usage | |
| Dormant (nW) | 141.9 |
| Awake and Sensing (mW) | 10.86 |
| Transmitting (mW) | 57.20 |

FIG. 2D

Active
Passive
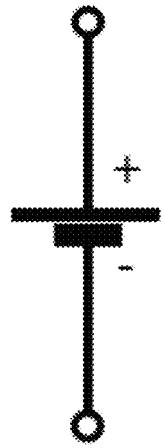
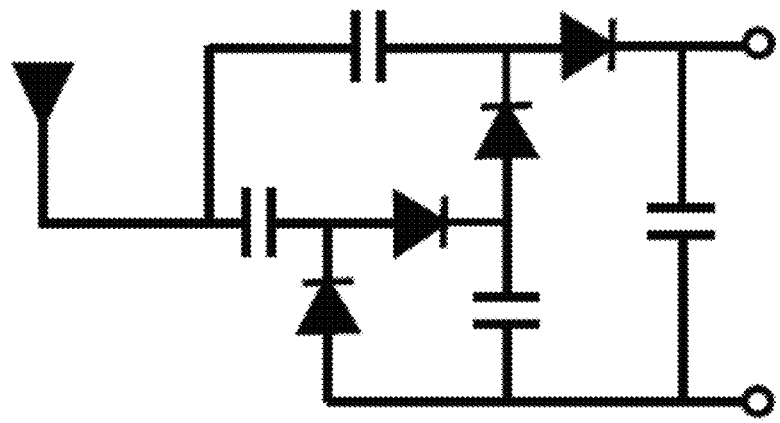
Battery
Charge-pump &
Capacitor
FIG. 7A
FIG. 7B
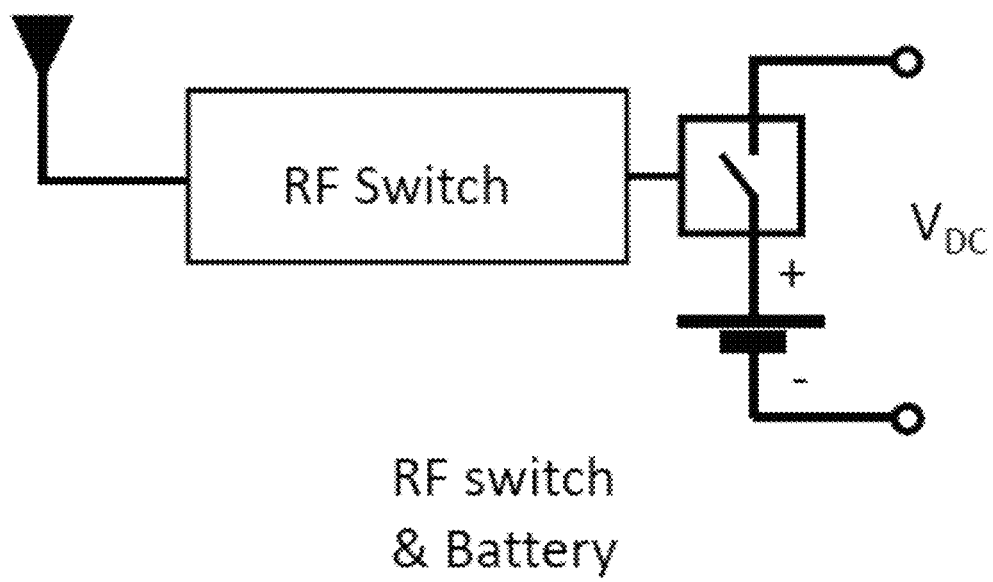
RF switch
& Battery
FIG. 7C

AUTONOMOUS VEHICLE SUPPORT USING HYBRID-POWERED EMBEDDED SENSORS

CROSS-REFERENCE TO RELATED APPLICATIONS

This application claims the benefit of U.S. Provisional Application No. 62/813,998 filed Mar. 5, 2019, the contents of which are incorporated by reference in its entirety.

STATEMENT REGARDING FEDERALLY SPONSORED RESEARCH & DEVELOPMENT

This invention was made with government support under CNS-1646380 awarded by the National Science Foundation. The government has certain rights in the invention.

BACKGROUND

In designing smart cities and autonomous vehicular systems, shown illustrated schematically in FIG. 9, the advantages of having infrastructure-to-vehicular communication is clear. Under challenging conditions (e.g. whiteout blizzard, heavy rain), supplying systems with an enhanced view of the surrounding world, such as: geo-location, infrastructure condition etc. could enhance their decision making process. One method of supplying this information is to endow the infrastructure with embedded sensors that can measure and relay this information to vehicles. The very nature of having embedded sensors provides a level of security against physical tampering, and measurements that would be difficult to capture from a moving vehicle. Some challenges in designing embedded sensors are having operation lifespans that match the infrastructure and enabling a wireless link that can transmit data in near-real time at high speeds.

Technological advances in real-time sensing and computing modalities have enabled the development of self-driving and driver assisted vehicles that can operate vehicles autonomously or offer assistance to human drivers. However, the development of an ideal sensing platform for vehicles remains an elusive target—especially when faced with non-ideal conditions (e.g. fog, loss of wireless link, unexpected changes in infrastructure conditions). For example, LIDAR based systems suffer especially poor performance in instances of heavy snow and rain. To mitigate these problems, several algorithmic and machine learning based methodologies have been developed to increase the performance of the vehicle sensing and decision making. Several other types of algorithmic solutions have been proposed, primarily increasing the amount of information shared between vehicles through the use of Inter-Vehicle Communication (IVC). An alternative to these approaches is Infrastructure-to-Vehicular (I2V) communication for the purpose of providing vehicles with additional information about their surroundings to aid in their decision making process. An I2V platform is illustrated in FIG. 1, where the infrastructure (tracks or pavement) can transmit data to the vehicles (trains or cars).

SUMMARY

Among the various aspects of the present disclosure is the provision of embedded wireless sensors.

A hybrid-powered RFID sensor device is provided that comprises a sensing module operatively coupled to a power source via an RF-triggered load switching module, the RF-triggered load switching module comprising an RF-DC converter coupled to a low-leakage load switch, wherein the RF-triggered load switching module operatively couples the power source to the sensing module via the low-leakage load switch using energy rectified from an RF signal received by RF-DC converter.

Other objects and features will be in part apparent and in part pointed out hereinafter.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 2D is a table summarizing device specifications of the hybrid-powered embedded sensor of FIG. 2B.

FIG. 7A is a schematic illustration of a power source and associated power control elements of an active sensor.

FIG. 7B is a schematic illustration of a power source and associated power control elements of a passive sensor.

FIG. 7C is a schematic illustration of a power source and associated power control elements of a hybrid-powered sensor.

Those of skill in the art will understand that the drawings, described below, are for illustrative purposes only. The drawings are not intended to limit the scope of the present teachings in any way.

DETAILED DESCRIPTION

In various aspects, an RF-triggered embedded sensor device that uses a passive front-end to wake up a battery-powered active wireless back-end to transmit data is disclosed. The disclosed device demonstrates a superior energy-performance trade-offs in terms of triggering distance, lifespan, and transmission latency.

Every year, hazardous driving conditions including, but not limited to, snow and harsh weather lead to a significant number of traffic accidents. These incidents are often attributed to limited visibility, and to lack of awareness of the driver about the microscale weather and road conditions such as black ice. Reduced reaction times of drivers may also produce major hazards due to a cascading chain of collisions. Road safety may be enhanced in the context of smart infrastructure that integrates a large number of hybrid radio-frequency identification sensors and devices.

Figure 4:
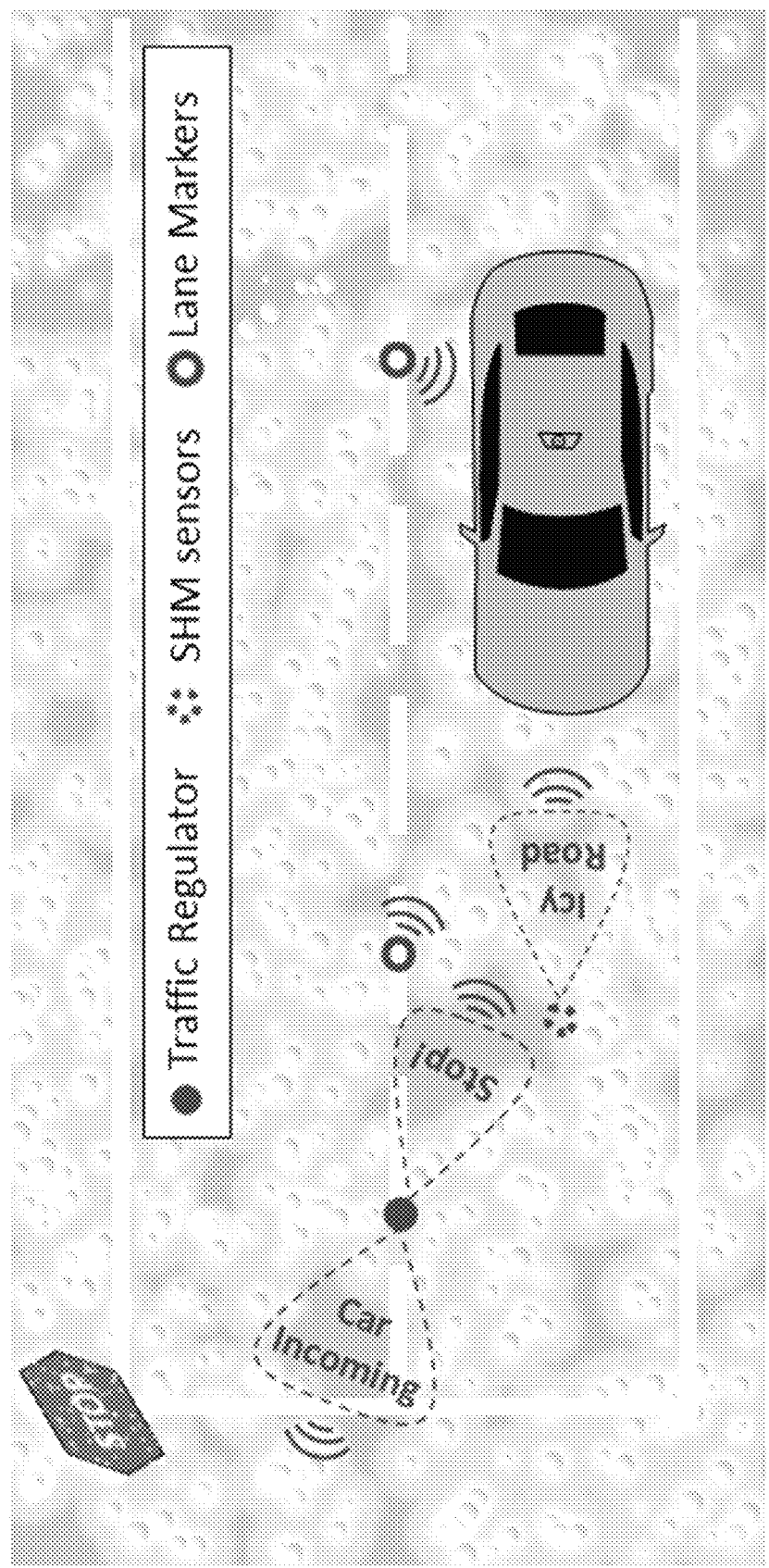
FIG. 4 is a schematic diagram illustrating potential uses of hybrid-powered embedded sensors in I2V communication.

As shown in FIG. 4, embedding sensor tags inside transport infrastructures like pavements and highways could support infrastructure-to-vehicle communications by which an autonomous or semi-autonomous vehicle can navigate without conventional LIDAR or visual recognition technology. However, design of embedded sensors and devices yields several challenges which include: (a) operational life-span of the sensors/tags matched to the maintenance lifespan of the infrastructure (decades); and (b) interrogation latency of the sensor/tags low enough to support real-time traffic moving at highway speeds.

In various aspects, the disclosed hybrid-powered embedded sensor device incorporates the benefits of both active and passive RFID tags, providing near-zero standby energy of a passive tag with the robustness of actively powered communication. Because the disclosed RF-triggered embedded sensor device is designed for embedded use, it is challenging to harvest energy using solar or other methods. Due to this limitation, and the fact that the embedded device needs to have an operational lifespan similar to the functional lifespan of the infrastructure (10 years or more) as powered by a small battery, the dormant state of the disclosed device when vehicles are not nearby operates in an extremely low-energy state. This low dormant-state energy usage is realized using a low-leakage switch that disconnects the battery from the active transmission (TX) components of the device, thus reducing battery current usages in the dormant state to the order of tens of nA. With the incorporation of the hybrid power configuration, the limiting factor for longer-lasting sensors is shifted from the battery capacity to the operational lifespan of the electronic components (e.g. capacitors, oscillators, etc.) that may ultimately limit the lifespan of the hybrid-powered embedded sensor device.

Figure 1:
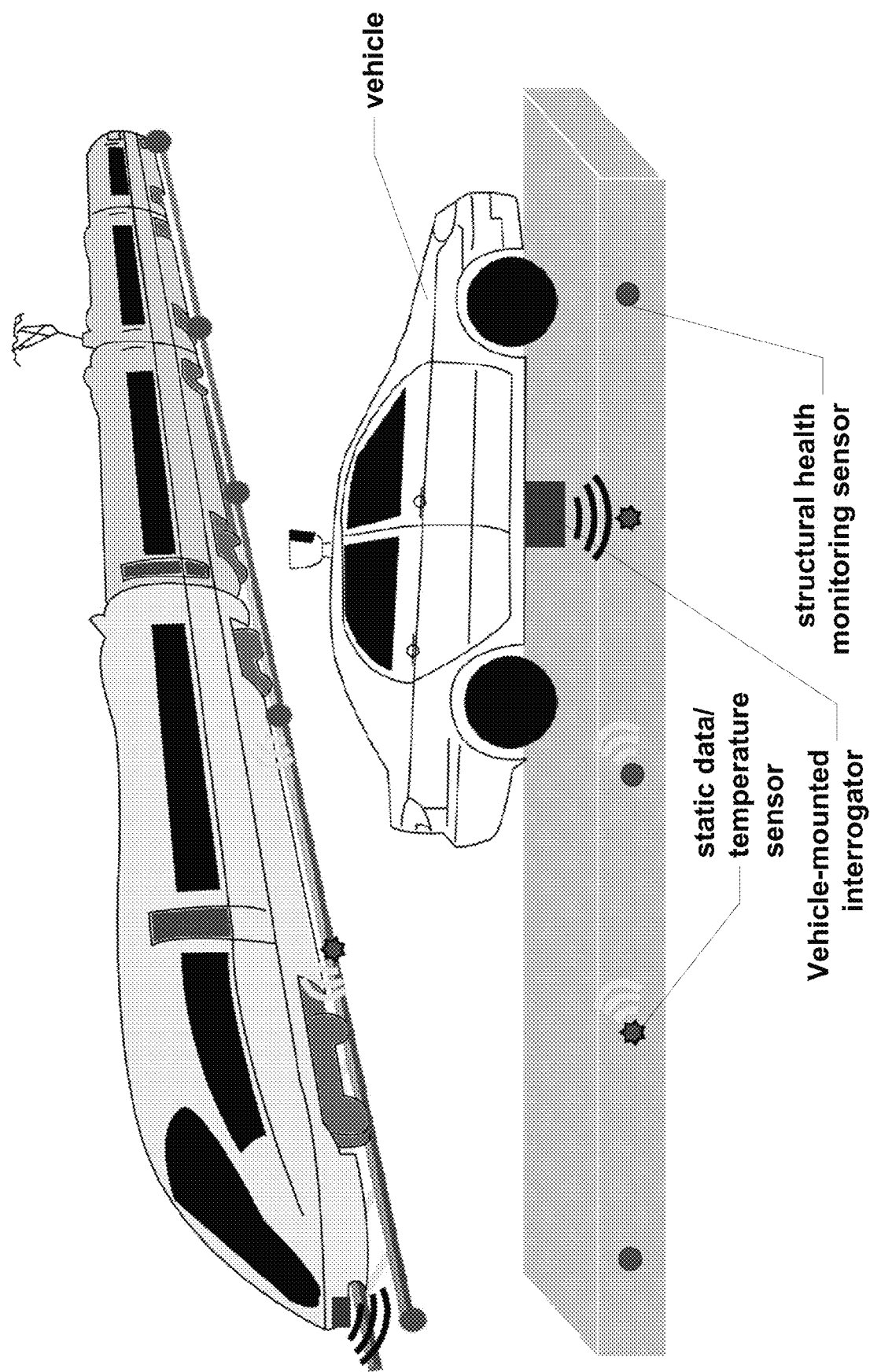
FIG. 1 is a schematic diagram illustrating Infrastructure-to-Vehicular (I2V) communication to a train and an automotive vehicle, in which the infrastructure is endowed with sensor nodes that provide wireless information pertinent to real-time decisions in moving vehicles.
Figure 2A:
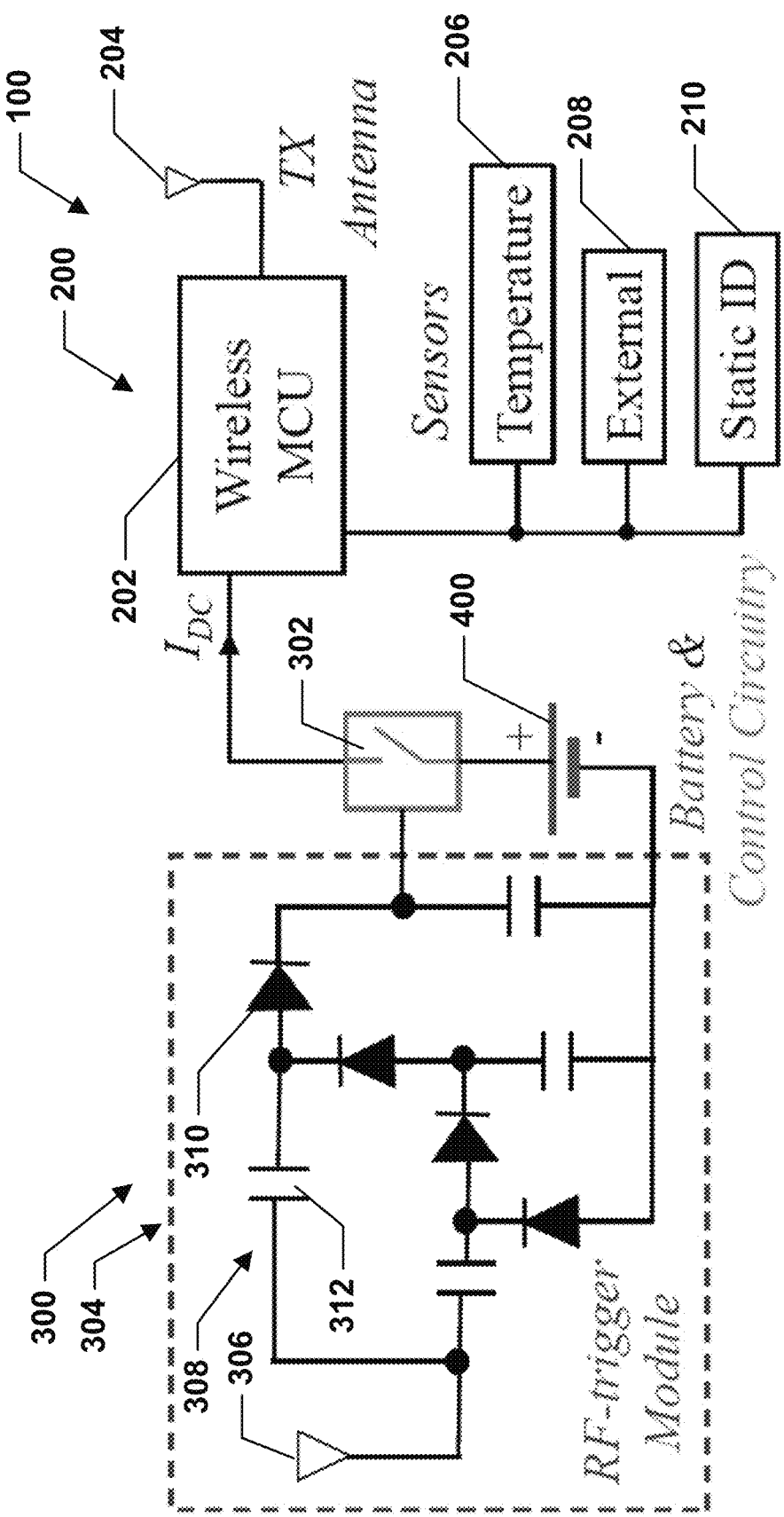
FIG. 2A is a schematic and block diagram of a hybrid-powered embedded sensor in accordance with one aspect of the disclosure.
Figure 2B:
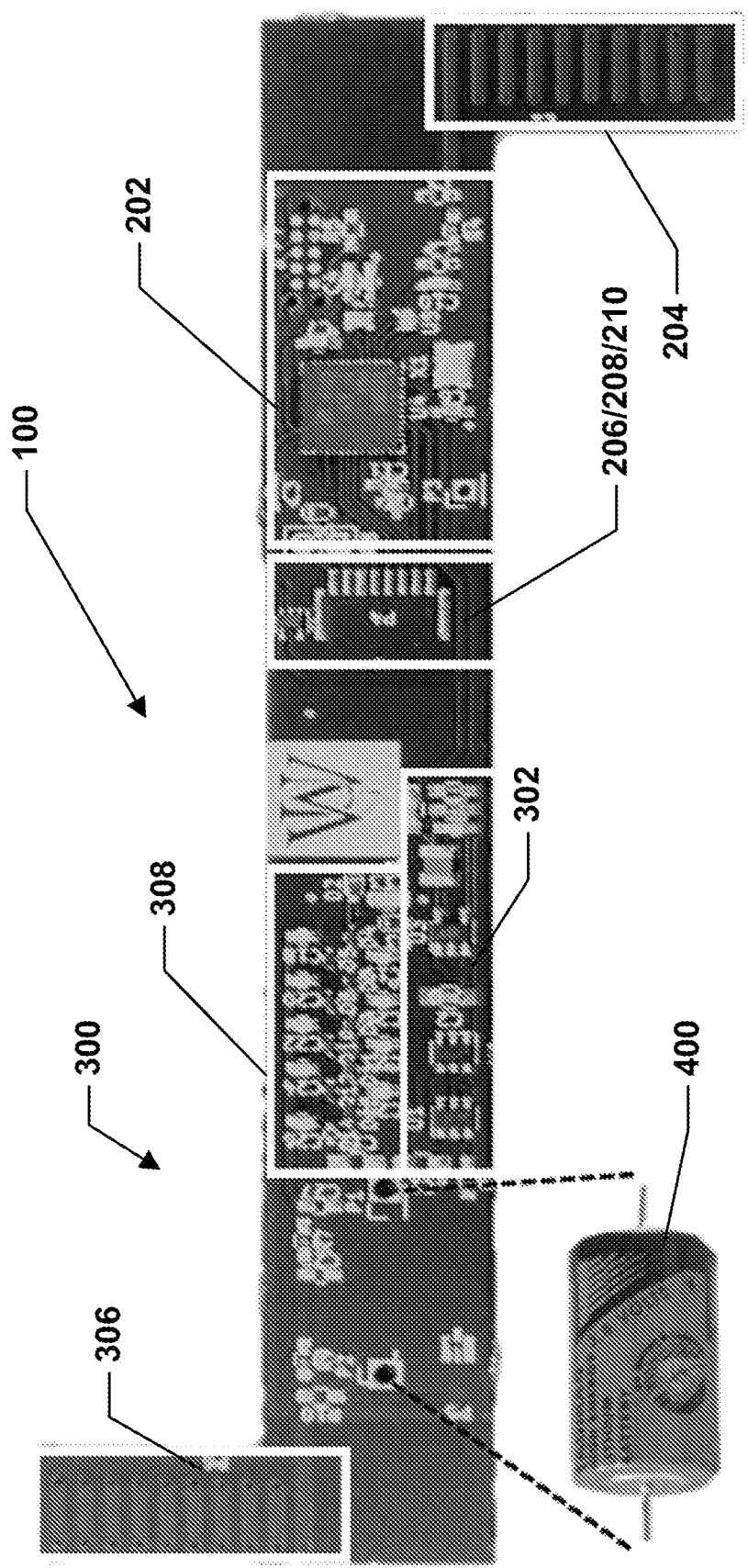
FIG. 2B is an image of a hybrid-powered embedded sensor in accordance with one aspect of the disclosure that includes a battery (i), an RF-trigger module (ii and iii), control circuitry (iv), sensors (v), a wireless MCU (vi), and an active transmission antenna (vii).

In one aspect, a hybrid-powered embedded sensor device 100 is illustrated in FIG. 2A and FIG. 2B. Referring to FIG. 2A, the device 100 includes a sensing module 200 operatively coupled to a power source 400 via an RF-triggered load switching module 300. The RF-triggered load switching module 300 includes a low-leakage load switch 302 operatively coupled to a RF-DC converter 304. The RF-DC converter 304 is configured to rectify an RF signal produced by a vehicle (not shown) into energy used to produce a switch activation signal. In response to the switch activation signal, the low-leakage load switch 302 operatively couples the power source 400 to the sensing module 200. In the absence of the switch activation signal, the low-leakage load switch 302 isolates the power source 400 from the sensing module 200.

In this aspect, the RF-DC converter 304 includes an energy-harvesting antenna 306 operatively coupled to a charge pump 308. The energy-harvesting antenna 306 is configured to rectify the energy from the RF signal, and the charge pump 308 is configured to produce the switch activation signal by boosting the energy rectified by the energy-harvesting antenna 306. As illustrated in FIG. 2A, the charge pump 308 may be a Dickson Charge Pump that includes an arrangement of zero threshold Schottky diodes 310 and pF capacitors 312.

The sensing module 200 includes an RF microcontroller (MCU) 202 operatively connected to at least one sensor and a transmitting antenna 204. The RF microcontroller (MCU) 202, when powered, is configured to collect DC signals representative of measurements obtained by the at least one sensor. The RF microcontroller (MCU) 202 is further configured to transmit the collected sensor data, along with stored static data, to the vehicle using the transmitting antenna 204.

Any suitable sensor may be selected for the at least one sensor including, but not limited to, a temperature sensor 206 that measures local temperature, an external sensor 208, an external sensor 208 that detects externally-derived information such as speed limits or traffic conditions, and a static ID 210 that stores and reports information such as the GPS coordinates of the device 100 or an identification number associated with the device 100.

In various aspects, the hybrid-powered embedded sensor device 100 is used to detect and communicate information to a vehicle passing within sufficiently close proximity of the device 100. As described herein, this information may include measurements obtained from at least one sensor, information transmitted to the device 100 such as traffic information, or stored static information such as a GPS position or a speed limit. In various aspects, a vehicle approaching the device 100 may request data by transmitting an RF interrogation signal in the 915 MHz ISM band. If the vehicle is sufficiently close to the device 100, the RF interrogation signal couples onto the RF-trigger antenna 306 in FIG. 2A and is rectified and boosted, in cooperation with the charge pump 308, to produce a DC switch activation signal that is detected by the low-leakage switch 302. Unlike an energy harvesting method, the RF interrogation signal only needs to trigger the gate of the switch 302, rather than providing sufficient energy to operate the entire device 100. Once the threshold voltage of the switch 302 is exceeded to trigger the gate, the switch 302 will operatively couple conducting the battery 400 to the wireless microcontroller (MCU) 202. The MCU 202, a Texas Instruments (TI) CC1310 in one aspect, collects any relevant data about its surroundings from the at least one sensor 206/208 and transmits the dynamic data, along with static data retrieved from the static ID 210 back to the vehicle. In one aspect, a static ID 210 indicating which sensor node is responding is sent, along with dynamic data collected from the temperature sensor 206, which may be an LMT84 analog output temperature sensor in one aspect. In various aspects, static data may also contain information about the sensor's geographical location, speed limits, metadata pertaining to the infrastructure, and any other suitable user-configurable data without limitation. The dynamic data may be collected through any MCU-compatible analog or digital sensor, though the energy usage of these sensors may impact the sizing requirements of the battery 400 since they are powered solely through the battery 400 and do not employ any supplementary energy-harvesting elements as sensor power sources.

A photograph of an assembled hybrid-powered embedded sensor device in one aspect is provided as FIG. 2B. In this aspect, the hybrid-powered embedded sensor device measures about 10 cm by 4 cm with a height under 1 cm when using a coin cell battery. It should be noted that the device shown illustrated in FIG. 2B is not a minimum-sized implementation. In various aspects, the dimensions of the device 100 can and will vary depending on specific application requirements including, but not limited to, the size of the power source, the number of sensors, and any other relevant design requirements without limitation.

Figure 7D:
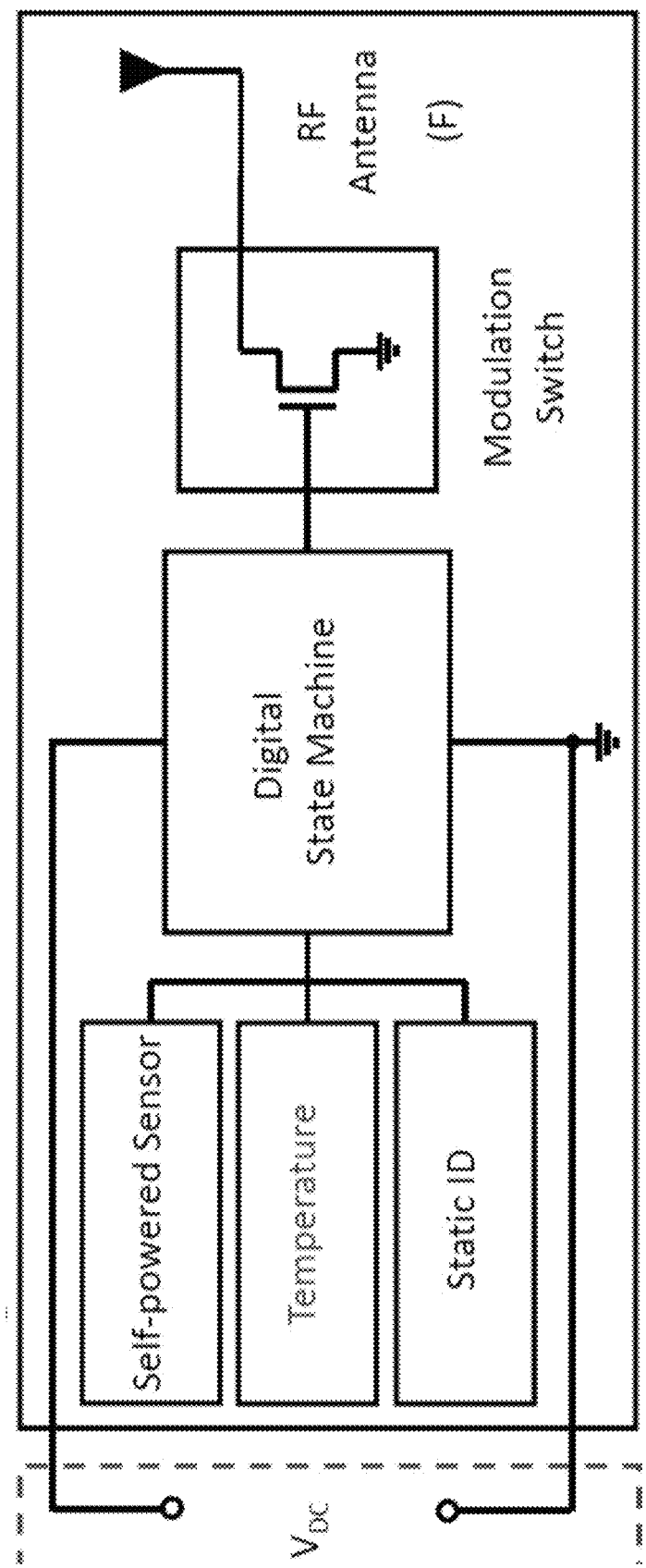
FIG. 7D is a schematic illustration of a sensor and transmission elements that may be powered using any of the power sources illustrated in FIG. 7A, 7B, or 7C.

Without being limited to any particular theory, wireless sensors may be categorized in terms of the design of the power source. As illustrated in FIG. 7A, active sensor devices derive power exclusively from batteries and therefore the operational lifetime of the device is limited by the battery capacity. As illustrated in FIG. 7B, passive sensor device capture energy from the environment, for example using a charge-pump and capacitor. Although the operational lifetime of passive sensor devices is not limited by battery capacity, passive sensor devices typically have considerably longer latencies relative to active sensor devices, which may limit the potential applications of passive sensor devices to situations in which longer latencies is not a limiting factor. As illustrated in FIG. 7C, hybrid-powered sensor devices harvest the energy of RF transmissions to power a load switch that couples the battery to a sensing module, as described above. The hybrid powered sensor device is characterized by both the short latency associated with the active sensing devices and the long operational lifetimes associated with the passive sensing devices. The characteristic of the various sensing devices are compared in Table 1 below.

TABLE 1

Design Characteristics of Various Sensor Categories

| | Active RFID | Passive RFID | Hybrid RFID (This Work) |
|---|---|---|---|
| Power Source | Internal to tag | Energy transfer from reader via RF | Tag uses energy from reader to trigger the internal power source to turn on active transmission |

TABLE 1-continued

Design Characteristics of Various Sensor Categories

| | Active RFID | Passive RFID | Hybrid RFID (This Work) |
|---|---|---|---|
| Tag Battery | Yes | No | Yes |
| Availability of Tag Power | Continuous | Only within field of reader | Only within field of reader |
| Required Signal Strength from Reader to Tag | Very Low | Very High | Moderate |
| Required Signal Strength from Tag to Reader | High | Very Low | High |
| Communication Range | Long Range | Short Range | Long Range |
| Sensor Capability | Ability to continuously monitor and record sensor input | Ability to read and transfer sensor values only when tag is powered by reader | Ability to read and transfer sensor values only when tag is triggered by the reader. |

The performance of the various types of sensing devices are compared in Table 2 below.

TABLE 2

Performance Parameters and Figure of Merit (FOM) for Active, Passive, and Hybrid-Powered Embedded Sensors

| Parameter | Active | Passive | Hybrid |
|---|---|---|---|
| PCB Area (cm$^2$) | 17.08 | 10.62 | 22.68 |
| Radio Band | | 915 MHz ISM | |
| Battery Capacity (Ahr) | 1.2 | N.A. | 0.5 |
| Avg. Power Consumption ($\mu$W) | 684 | 320 | 10.15 |
| Lifetime (yrs) | 0.6 | 20 | ≈17 |
| Distance (m) | 100 | 0.5 | 8 |
| Startup Latency (ms) | 15 | 200 | 26 |
| FOM | 0.2725 | 0.5236 | 0.8227 |

Figure 11:
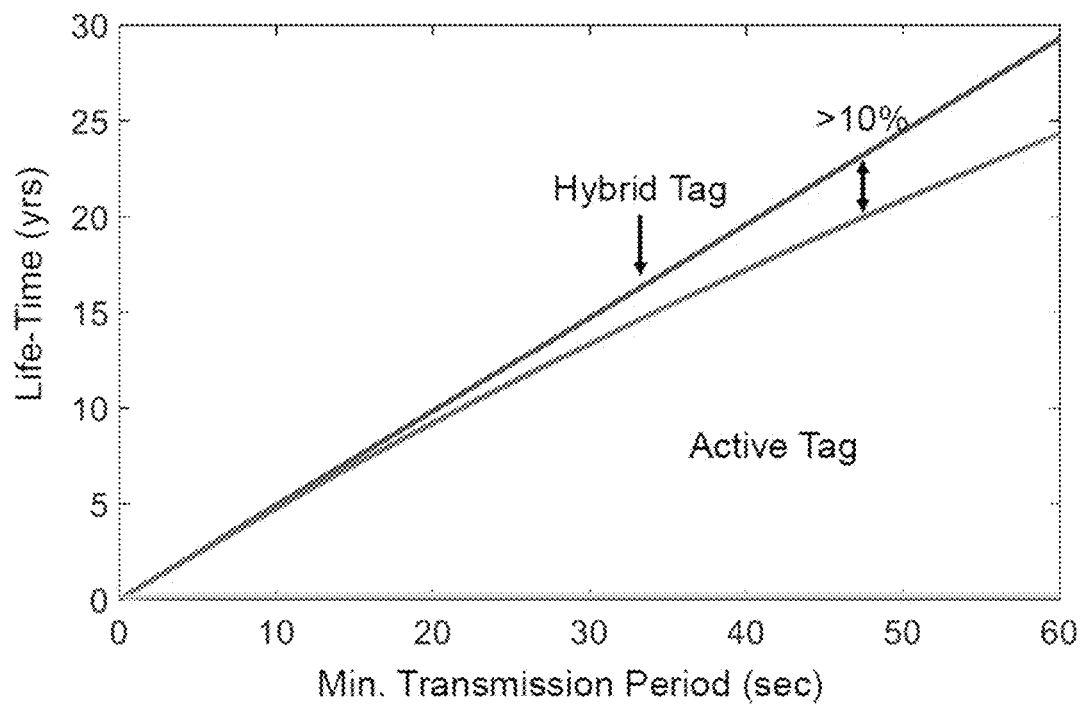
FIG. 11 is a graph comparing the lifespans of hybrid and active sensors at a range of different transmission periods.
Figure 12:
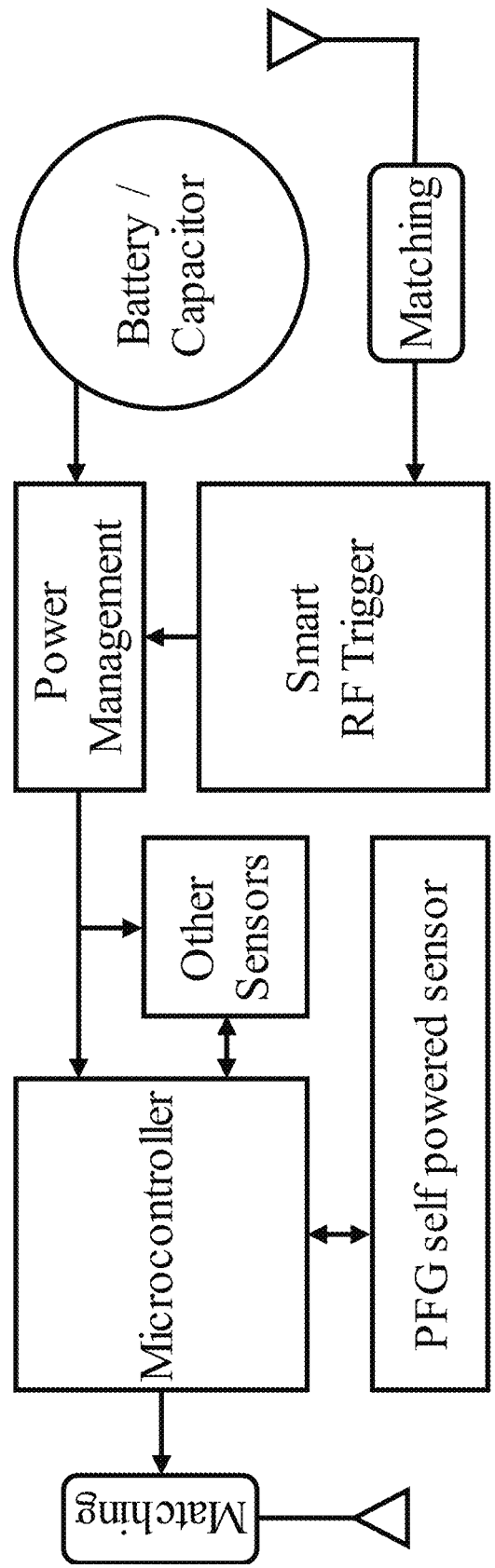
FIG. 12 is a block diagram of a hybrid-powered embedded sensor in accordance with one aspect of the disclosure
Figure 13:
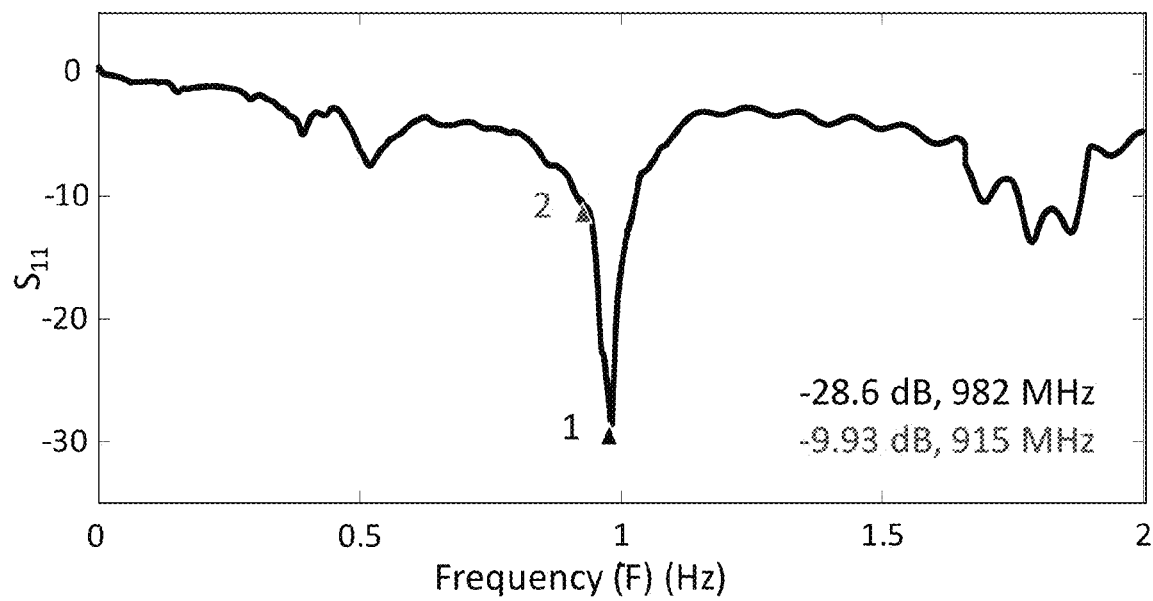
FIG. 13 is a graph summarizing antenna S11 matching for the hybrid-powered embedded sensor of FIG. 12.
Figure 14:
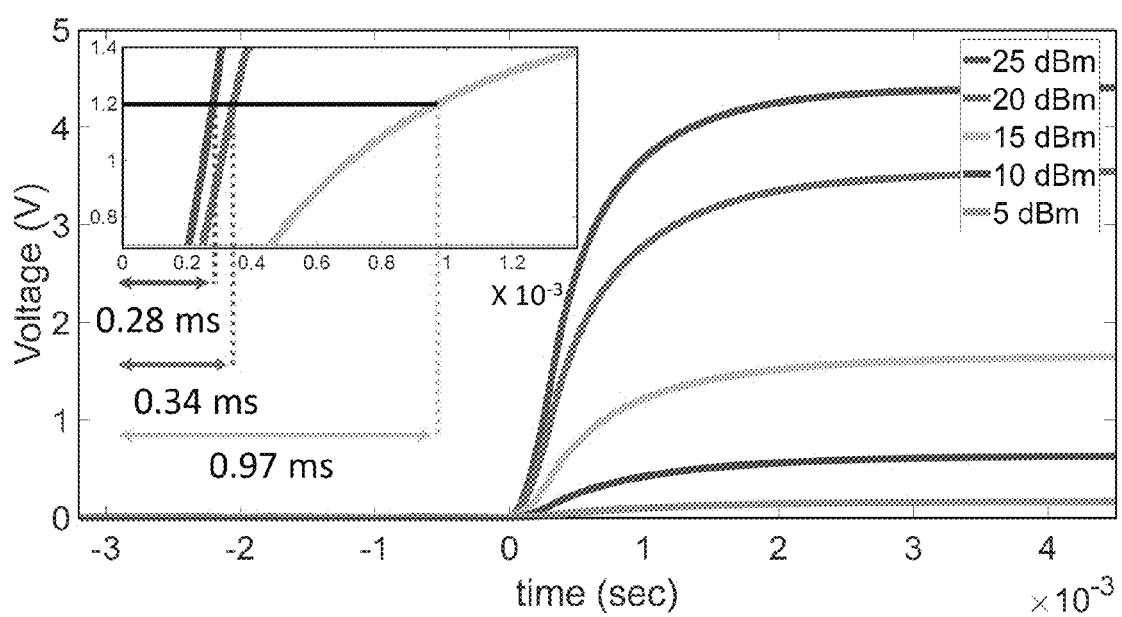
FIG. 14 is a graph summarizing RF-trigger delay for varying levels of input RF energy for the hybrid-powered embedded sensor of FIG. 12.
Figure 15:
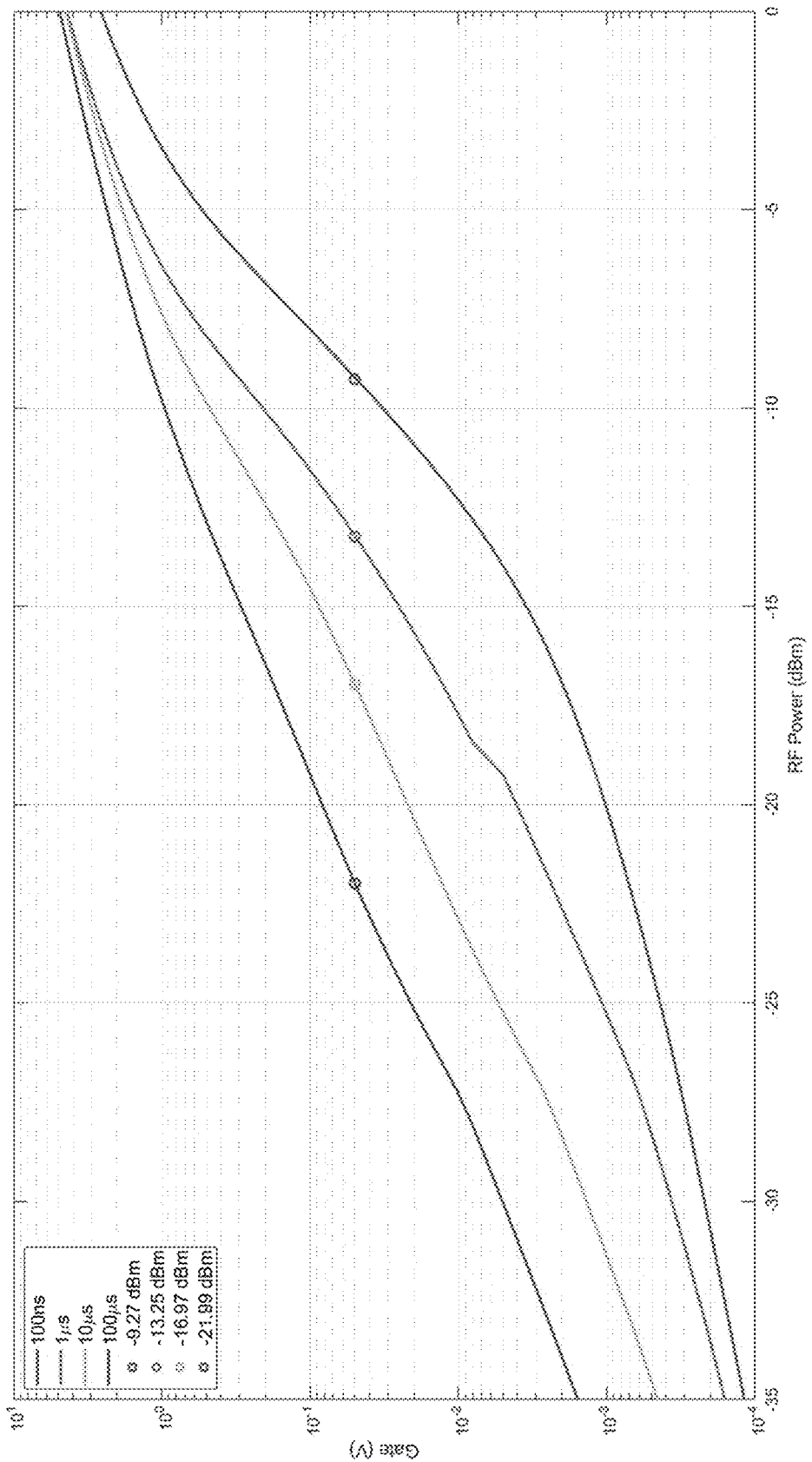
FIG. 15 is a graph summarizing gate voltages obtained at varying levels of input RF energy and trigger delays for a hybrid-powered embedded sensor.
Figure 16:
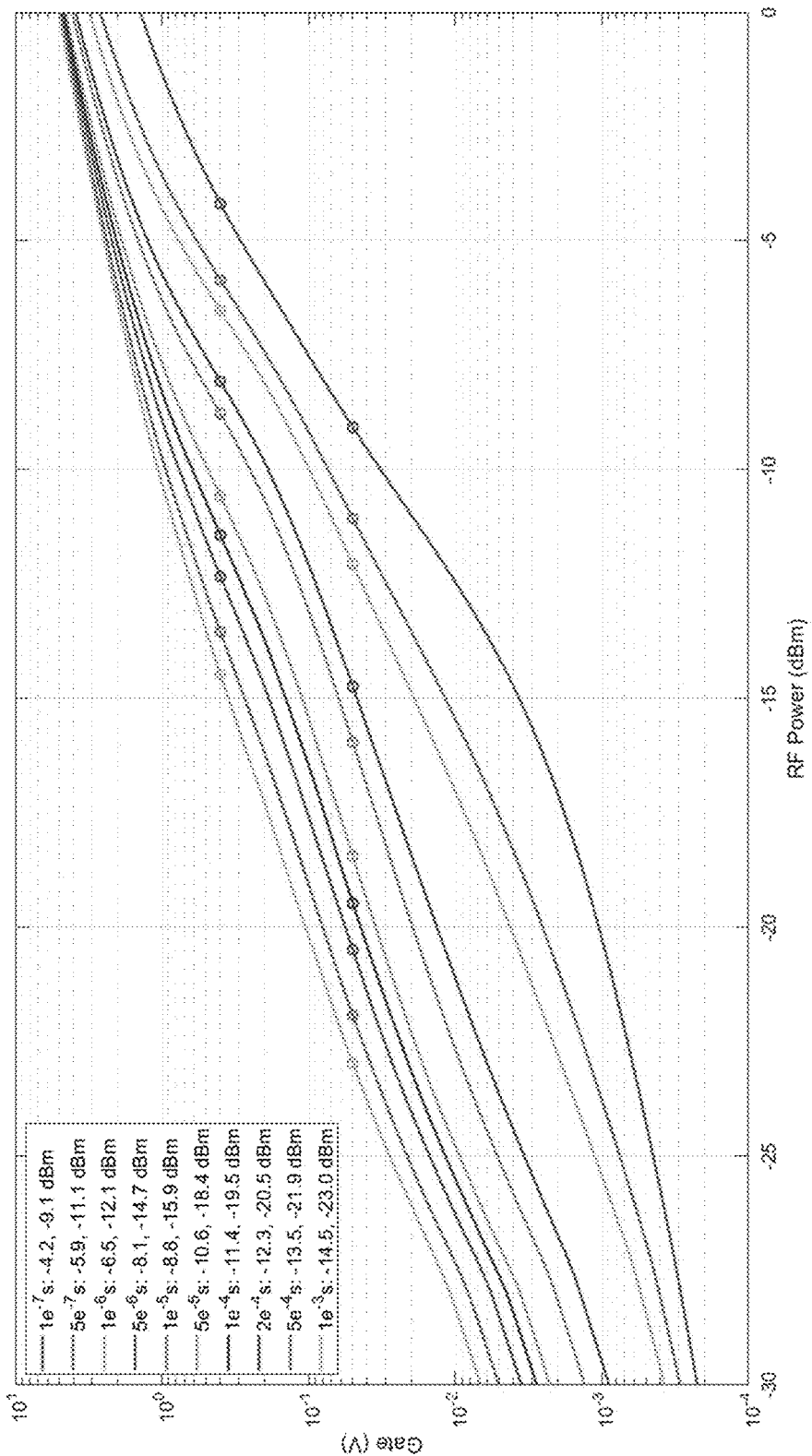
FIG. 16 is a graph summarizing gate voltages obtained at varying levels of input RF energy and trigger delays for a hybrid-powered embedded sensor.

FIG. 11 is a graph comparing the estimated life-time with respect to different traffic rates (seconds between transmissions) of a hybrid prototype (blue) an active sensor (yellow) and an active sensor that aggressively takes advantage of low power modes (red). The estimates indicate that the hybrid-powered approach of the disclosed hybrid-powered embedded sensor device results in a longer life-time at all traffic rates, especially as the minimum transmission period increases. As vehicle-to-vehicle communication becomes commonplace, the minimum I2V transmission period is expected to continue to increase, thus providing an even greater advantage to the hybrid-powered approach.

Figure 5:
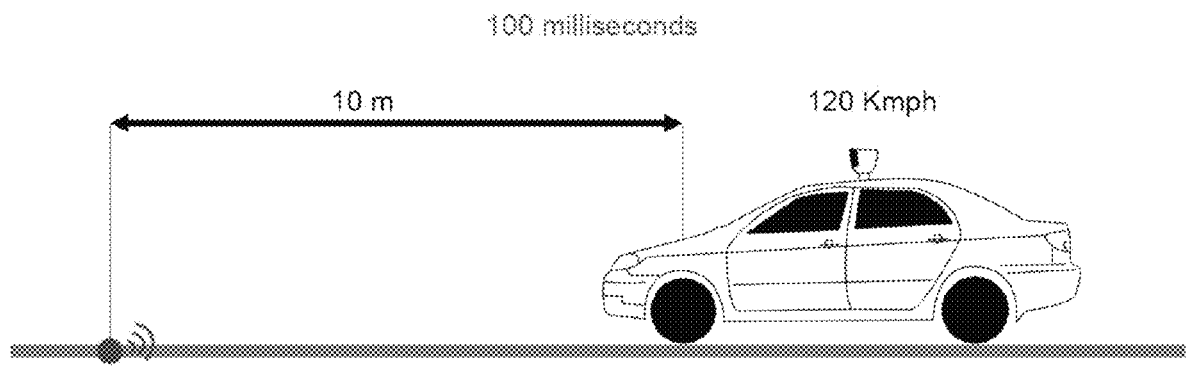
FIG. 5 is a schematic diagram illustrating performance parameters associated with I2V communication with a vehicle moving at expressway speeds of approximately 120 km/hr.

FIG. 5 is an diagram illustrating the significance of latency in the context of operating vehicles at highway speeds. A vehicle traveling at 120 Kmph (representative of highway speeds) will take about 100 ms to travel 10 m, a distance representative of the maximum RF transmission distance of the sensing device. Thus, an embedded sensing device must be activated and transmit a complete data package to the vehicle with a time window of about 100 ms.

Figure 6:
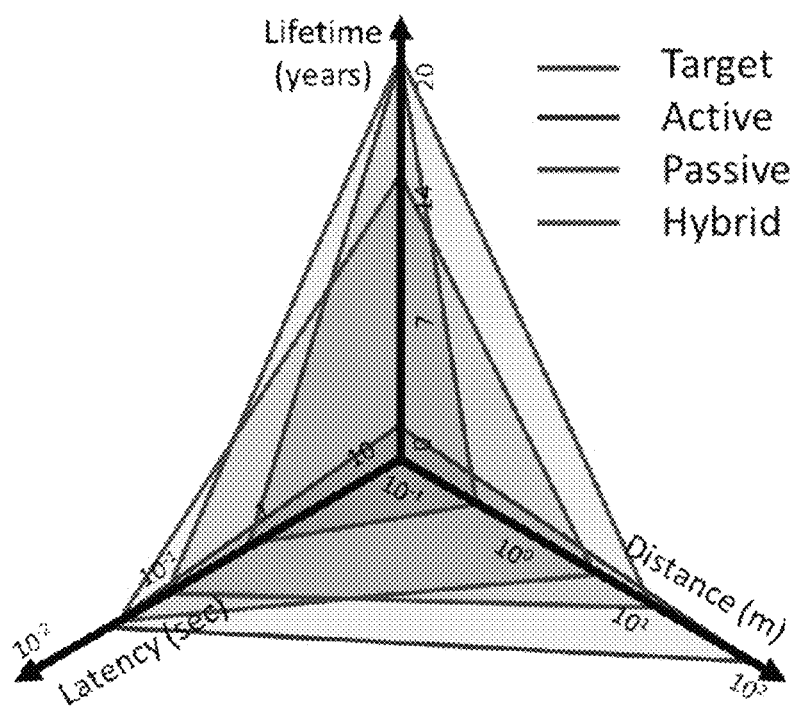
FIG. 6 is a graph comparing operational life, start-up latency, and transmission distance metrics for active, passive, and hybrid-powered embedded sensors, as well as target parameters for operation with vehicle moving at expressway speeds as illustrated in FIG. 5.

FIG. 6 is a graph comparing the performance parameters associated with the passive, active, and hybrid-powered sensing devices in terms of operational lifetime, latency, and transmission distance, as well as a target performance for operation with vehicles travelling at highway speeds. The performance parameters of the hybrid-powered sensor devices are most closely matched to the target design parameters.

Although the hybrid-powered sensing devices are described herein in terms of embedded highway sensors, the disclosed devices may be used in a variety of additional applications including, but not limited to, above-surface applications that require lower latency than passive sensing devices can provide, such as parking lot tags, highway toll booth, and high-speed rail. In addition, the hybrid-powered sensing devices may be used in any application needing longer operational lifespan than active sensor devices can provide, including environmental monitoring and agricultural asset tracking.

Embodiments of this disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of this disclosure may be implemented with any number and organization of such components or modules. For example, aspects of this disclosure are not limited to the specific computer-executable instructions or the specific components or modules illustrated in the figures and described herein. Other embodiments of this disclosure may include different computer-executable instructions or components having more or less functionality than illustrated and described herein. Aspects of this disclosure may also be practiced in distributed computing environments where tasks are performed by remote processing devices that are linked through a communications network. In a distributed computing environment, program modules may be located in both local and remote computer storage media including memory storage devices.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

Any non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

EXAMPLES

Example 1: Power Consumption of RF-triggered Embedded Sensing Devices

To assess the operational characteristics of a hybrid-powered embedded sensor device, the following experiments were conducted.

A hybrid-powered embedded sensor device similar to the device disclosed above and illustrated in FIG. 2A was used for these experiments. Battery current was monitored during three operational stages of the device: i) a dormant stage when the power source was isolated from the sensing module; ii) a sensing stage when the MCU is obtaining sensor measurements and static data; and iii) a transmission stage, when the MUC is transmitting the obtained data via the transmission antenna of the sensor module. The battery current was obtained as the sum of the current measured at four different elements of the device: the bypass capacitors and the load switch of the RF-triggered triggered load switching module, as well as the temperature sensor and the wireless MCU of the sensing module.

Figure 2C:
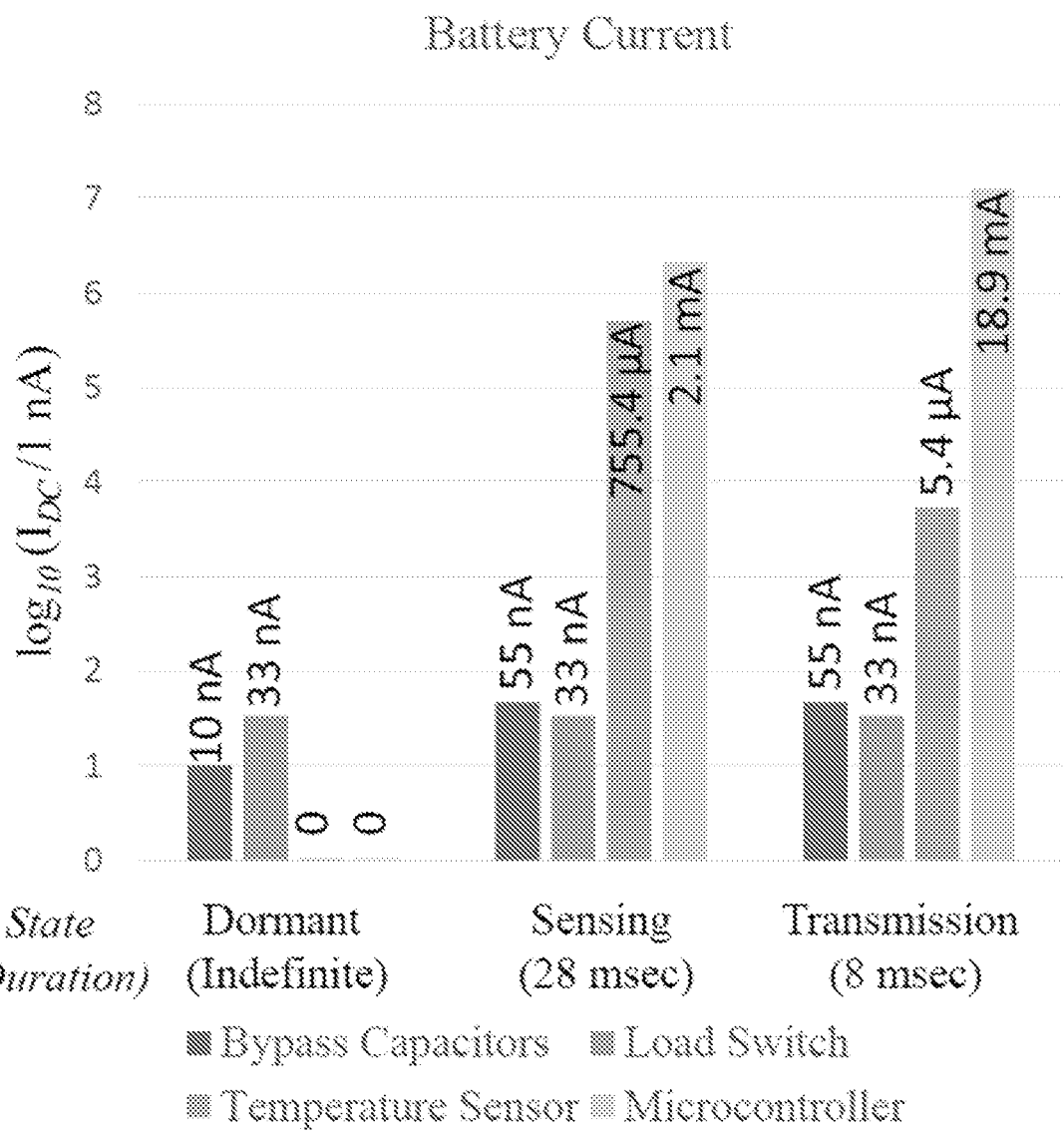
FIG. 2C is a bar graph summarizing measured battery usage of the hybrid-powered embedded sensor of FIG. 2B at various operational stages.

The measured battery current requirements of the three operating stages of the device are summarized in FIG. 2C. In the dormant state, battery current was about 43 nA. When measuring analog signals using the temperature sensor during the sensing stage, the battery supply current is just under 3 mA. At the sensing stage, the supply current included 755 µA to power the temperature sensor and 2.1 mA to power the wireless MCU, in addition to 88 nA supplied to the bypass capacitors and load switch. During the transmission stage the battery supply current was at its highest level of almost 19 mA. The battery current at the transmission stage was almost entirely used to power the microcontroller (18.9 mA), in addition to 5.4 µA supplied to the temperature sensor and 88 nA supplied to the bypass capacitors and load switch.

FIG. 2D contains a table summarizing other parameters characterizing the hybrid-powered embedded sensor device that were determined during these experiments. In various aspects, line-of-sight transmission distances of the hybrid-powered embedded sensor device may reach hundreds of meters. However, a line-of-sight transmission distance of about 10 m is sufficient for transmitting data to vehicles from embedded sensors along an expressway or other roadway. In addition, based on the battery capacity of 1000 mA-hr and the power consumption for each interrogation/data transmission cycle as described above, the operational lifetime of the device was estimated to be over 20 years assuming representative vehicle traffic.

Figure 3:
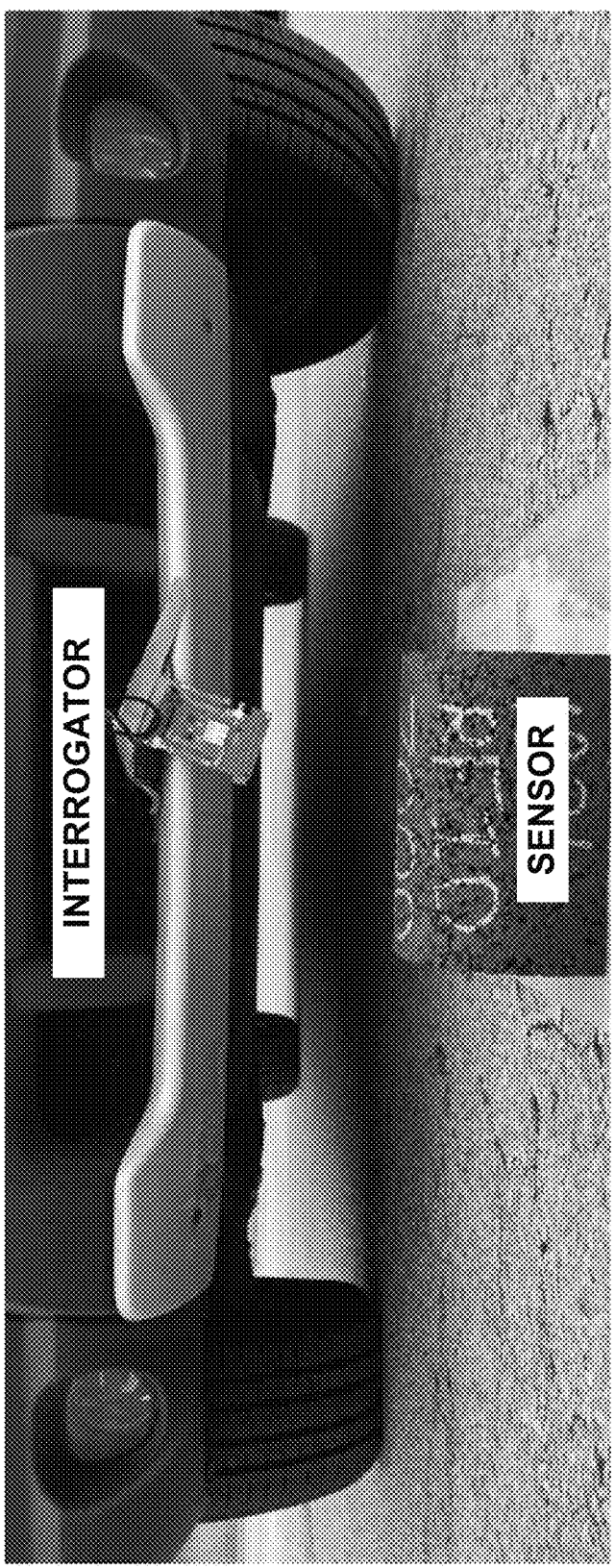
FIG. 3 is an image of a field test setup that includes an asphalt-embedded sensor and a car-mounted interrogator.

In the test configuration of FIG. 3, an interrogation system comprises a USB battery pack powering a TI CC1310 Launchpad, mounted to the bumper of a car. A sensor tag was embedded in asphalt, as visible in the bottom of the figure. The vehicle was driven over the asphalt sample at velocities up to 40 kmh−1 and was able to trigger the embedded sensors and collect data. Tests were carried out with ambient temperatures near 0° C., with collected sensor readings in agreement.

Example 2: Field Operation of RF-Triggered Sensor Device with Moving Vehicle To validate interrogation and data transmission in the field between a vehicle-mounted interrogator and a hybrid-powered embedded sensor device, the following experiments were conducted.

As illustrated in FIG. 3, an interrogation system that included a USB battery pack powering a TI CC1310 Launchpad was mounted to the bumper of a vehicle. A hybrid-powered sensor device similar to the device of Ex. 1 was embedded in asphalt, as shown at the bottom of FIG. 3. The vehicle and mounted interrogation system was driven over the asphalt sample containing the embedded device at velocities up to 40 kmh$^{-1}$ and was able to trigger the embedded sensors and collect data. Tests were carried out with ambient temperatures near 0° C., and the readings collected from the temperature sensor of the device were in agreement with the independently-obtained ambient temperatures.

Example 3: Operation of RF-Triggered Sensor Device with Moving Interrogator

To assess the performance of a hybrid-powered embedded sensor device with one or more moving interrogators representative of vehicles traveling on a road, the following experiments were conducted.

Figure 10:
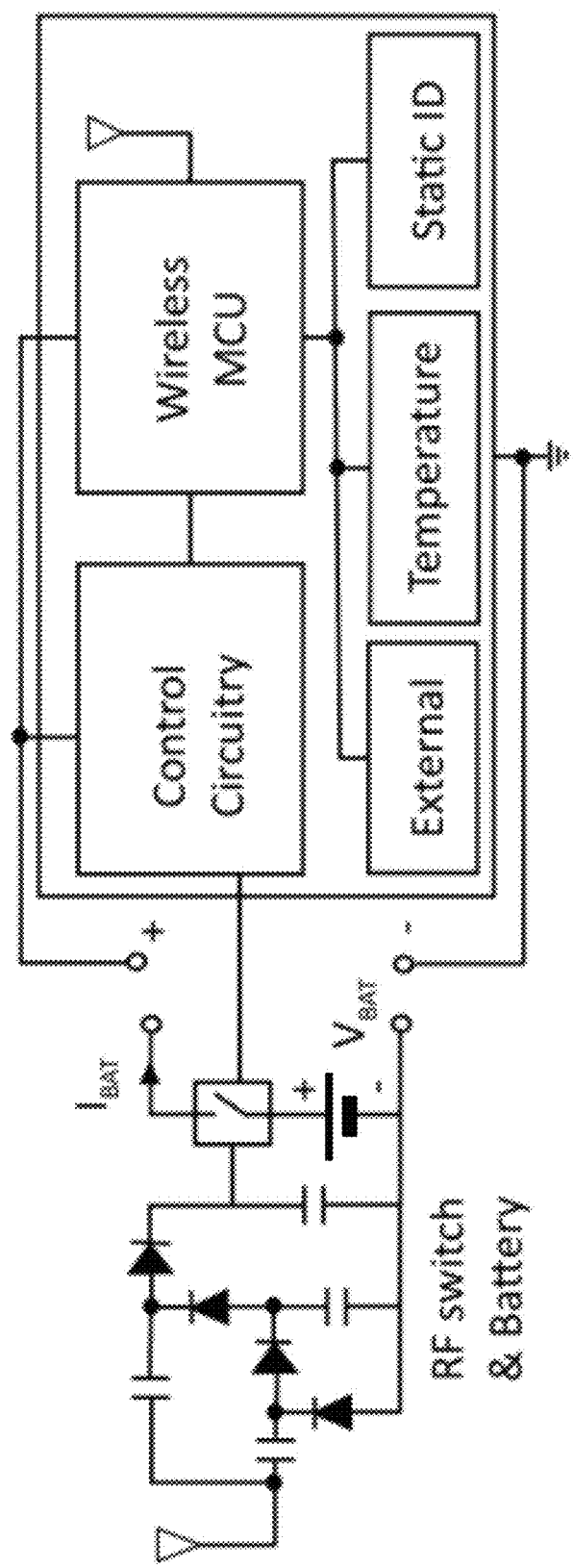
FIG. 10 is a schematic and block diagram of a hybrid-powered embedded sensor in accordance with one aspect of the disclosure.

A hybrid-powered embedded sensor device illustrated schematically in FIG. 10 was used for these experiments. The RF-triggered load switching module circuitry included a five-stage Dickson Charge Pump built using pF capacitors and zero threshold Schottky diodes (SMS7621-079LF, from Skyworks Solutions Inc.). The charge pump operated with an efficiency of approximately 40%, while the helical PCB antenna connected to the input stage was designed for use in the US ISM Band at 915 MHz with a measured S11 of −9.93 dB. Energy that coupled onto the energy-harvesting antenna was boosted by the charge pump and used to signal an ultra-low power latch (TPL5111, from Texas Instruments) that was connected to a load switch (TPS22860) that isolated the battery from the elements of the sensing module. Unlike a traditional energy harvesting approach that attempts to provide the several mA of supply current for a sensor system using the RF to DC charge pump, this method essentially only needs to charge the gate of a MOSFET. By drastically reducing the load of the charge pump, the sensitivity and responsiveness of the system was enhanced.

At a fixed transmission distance of 1 m, 212 µs of RF interrogation signal transmission was needed to reach a switch threshold voltage on the 10 nF source capacitor with a continuous interrogator transmission of 20 dB, which was within the limits specified by the FCC. For reference, a vehicle traveling at highway speeds (120 kmh$^{-1}$) moves approximately 3.3 cm ms$^{-1}$. Once the voltage on the enable pin of the latch exceeds the switching threshold (530 mV), the load switch has a measured internal latency of 13 ms, which is one of the larger sources of latency in the device. For preliminary system evaluation, this latency was not a major limitation; however, if a faster hybrid startup is required, the TPL5111 may be replaced by a discrete network of transistors to lower the the internal latency of the load switch to ns levels. The timer enable pin was also connected to a pulldown resistor, the value of which causes the internal circuitry of the timer to manually shut off power to the MCU and sensors after a fixed amount of time proportional to this resistance. In this implementation of the device, this timer operated as a watchdog, preventing the system from getting stuck in an unwanted state. After triggering, the timer enabled the TPS22860 load switch, which supplied power to the MCU and various sensors.

The sensing module contained an RF MCU and multiple sensors which have the capability of delivering both static and dynamic data to a vehicle as it interrogates the tag. The device used in these experiments used a CC1310 Wireless MCU from Texas Instruments to collect and transmit data wirelessly back to the vehicle. A LMT84 analog temperature sensor was included in the device to generate representative dynamic data. As with most MCUs, several other types of sensors may be integrated to supply a wide variety of information that can be used to characterize the infrastructure, provided the additional sensors operate from a standard analog or digital interface. However, the incorporation of additional modalities and functions may potentially increase the power consumption or latency of the device. In addition to the dynamic data, a static 16-byte array was assigned to each sensor, capable of providing a large amount of identification information, such as an infrastructure ID, lane markers, speed limits, road history, or surface material. Once all data has been collected by the MCU, it is transmitted back to the interrogator over a 915 MHz ISM link with a transmit power of 8 dB. Transmit distances of complete packets of distances much greater than 10 m were measured. Upon completing transmission of data to the interrogator, the MCU reverted back into a dormant state by asserting a done signal to the switch, forcing an immediate shutdown of all subsystems.

For these experiments, the interrogation system consisted of a software defined radio (SDR) providing the energy to the RF-triggered load switching module. A separate TI CC1310 connected to a PC received any transmitted data from the hybrid boards. The TI CC1310 reader on the interrogator continuously listened for returning data packets and was able to detect any valid transmissions and logged the transmissions back to a PC for further analysis and long-term storage.

Evaluation and system testing of the hybrid-powered embedded sensor device was conducted in a controlled laboratory environment. To test the hybrid-powered embedded sensor device in situations representative of real world deployment, three test scenarios were utilized. The first test scenario consisted of a zipline apparatus that caused the device to move past the interrogator at a fixed distance, and at a repeatable speed, as depicted in FIG. 8A. The reader component of the interrogator was located a distance of approximately 10 m away to demonstrate the device's ability to maintain communication with a vehicle even if the vehicle-mounted interrogator was not positioned within the immediate vicinity of the device during data transmission. The hybrid-powered embedded sensor device functioned successfully at speeds up to approximately 38.26 km h−1 (velocity estimated from high-speed video).

A second experimental configuration tested the ability of the hybrid-powered embedded sensor device to respond several times in rapid succession in a manner representative of operation on a busy road where many vehicles would interact with the device over a short period of time. The hybrid-powered embedded sensor device was mounted on a circular track with a movement apparatus that caused the device to pass by an interrogator approximately once every five seconds. In this experiment, the device was able to successfully operate continuously over about 50 successive trials. During this experiment, no false triggers occurred, demonstrating that the sensitivity of the device was precisely controlled.

Figure 8B:
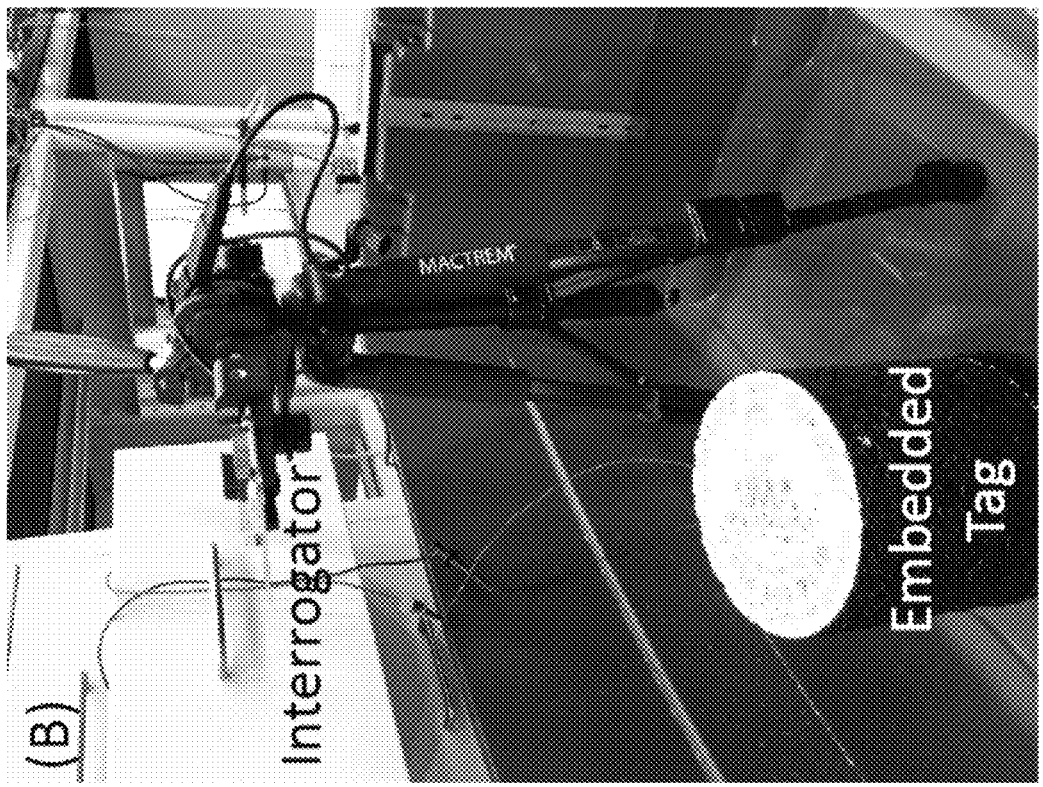
FIG. 8B is an image of a simulated environment for testing the performance of embedded hybrid-powered tags.
Figure 8A:
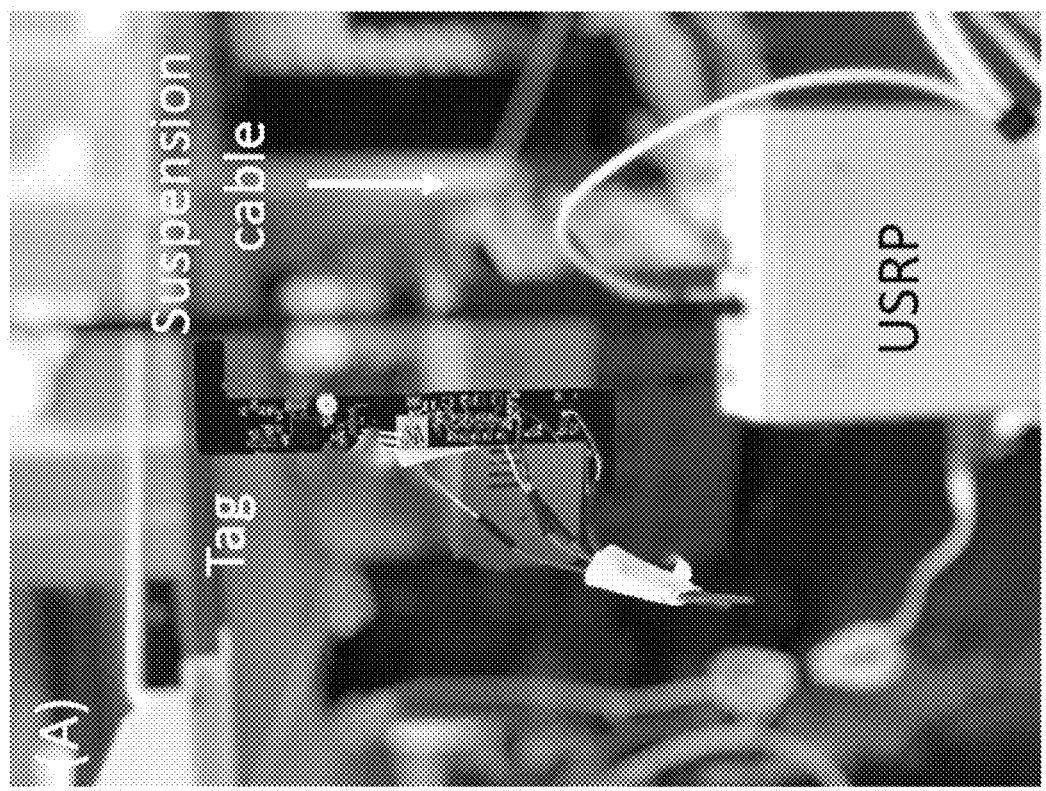
FIG. 8A is an image of a hybrid-powered tag.
Figure 8C:
FIG. 8C is an image of a vehicle field-testing testing the performance of embedded hybrid-powered tags.
Figure 9:
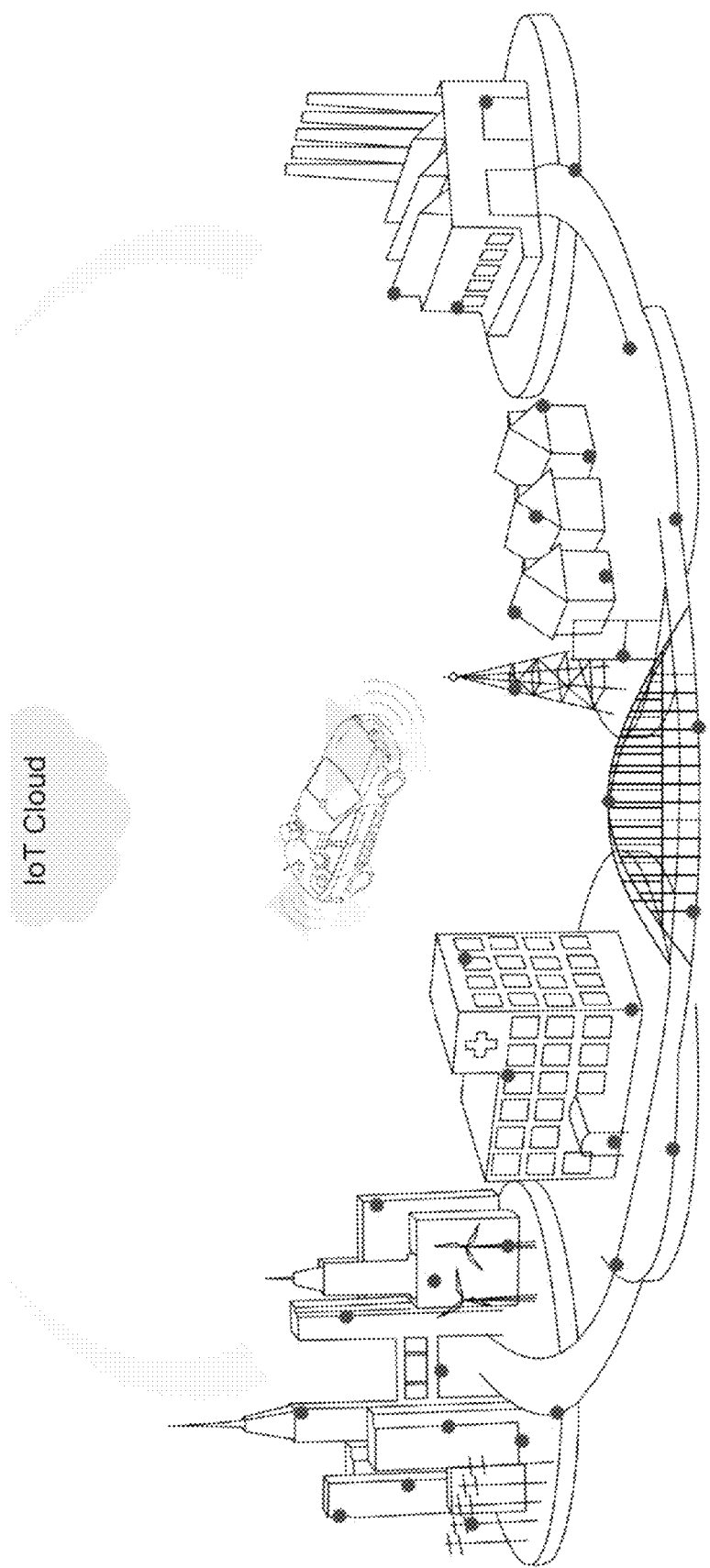
FIG. 9 is a schematic illustration illustrating the architecture of an I2V communications network for autonomous and/or semi-autonomous vehicles.

Preliminary testing was also conducted to evaluate the feasibility of the RF-triggered load switch when the node was embedded in a simulated deployment environment, as illustrated in FIG. 8B. During this testing, the hybrid-powered embedded sensor device was placed under 8 inches of asphalt that was partially submerged in water while the RF interrogator antenna was placed 16 inches above the surface of that asphalt. This test verified that in stationary conditions, the interrogator was able to consistently deliver enough energy to the device to trigger the load switch.

What is claimed is:

1. A hybrid-powered RFID sensor device comprising a sensing module operatively coupled to a power source via an RF-triggered load switching module, the RF-triggered load switching module comprising an energy-harvesting antenna coupled to a charge pump, the charge pump coupled to a low-leakage load switch, wherein the RF-triggered load switching module operatively couples the power source to the sensing module by receiving and rectifying the RF interrogation signal at the energy-harvesting antenna and boosting the rectified RF interrogation signal into a DC switch activation signal sufficient to close the low-leakage switch.

2. The device of claim 1, wherein the RF-triggered load switching module isolates the power source from the sensing module in the absence of the DC switch activation signal.

3. The device of claim 2, wherein the RF-triggered load switching module further comprises a switch timer operatively coupled to the low-leakage load switch, wherein the switch timer decouples the power source from the sensing module after a predetermined interval.

4. The device of claim 3, wherein the switch timer is an ultra-low power latch.

5. The device of claim 3, wherein the energy-harvesting antenna is a helical PCB antenna.

6. The device of claim 1, wherein the charge pump is a Dickson Charge Pump.

7. The device of claim 1, wherein the sensing module comprises an RF microcontroller (MCU) operatively connected to at least one sensor and a transmitting antenna, the RF microcontroller (MCU) configured to collect sensor data from the at least one sensor and to transmit the collected data via the transmitting antenna.

8. The device of claim 7, wherein the at least one sensor is selected from the group consisting of a temperature sensor, a traffic signal sensor, a structural condition sensor, and a road condition sensor.

9. The device of claim 7, wherein the RF microcontroller (MCU) is further configured to transmit stored static data via the transmitting antenna, the stored static data comprising a pavement type, a highway mile marker number, a geolocation, a device ID, a lane marker, a pavement type, a speed limit, and any combination thereof.

10. The device of claim 1, wherein the operational lifespan is at least 20 years.

11. A method of transmitting data from a hybrid-powered RFID sensor device to a moving vehicle, the hybrid-powered RFID sensor device comprising a sensing module operatively coupled to a power source via an RF-triggered load switching module comprising an energy-harvesting antenna coupled to a charge pump, wherein the charge pump is further coupled to a low-leakage load switch, the method comprising:

a. producing an RF interrogation signal at the vehicle;
b. receiving and rectifying the RF interrogation signal at the energy-harvesting antenna;
c. boosting the rectified RF interrogation signal at the charge pump to produce a DC switch activation signal sufficient to close the low-leakage switch;
d. closing the low-leakage load switch in response to the DC switch activation signal to operatively couple the power source to the sensor module; and
e. collecting sensor data from at least one sensor of the sensing module and transmitting sensor data and static data to the vehicle via the transmitting antenna of the sensing module.

12. The method of claim 11, further comprising decoupling the sensing system from the power source after a predetermined interval using a switch timer operatively coupled to the low-leakage load switch of the RF-triggered load switching module.

13. The method of claim 12, wherein collecting static data and sensor data from at least one sensor of the sensing module further comprises receiving the sensor data from at least one sensor selected from the group consisting of a temperature sensor, a traffic signal sensor, a structural condition sensor, and a road condition sensor.

14. The method of claim 12, wherein collecting static data further includes retrieving stored static data comprising a pavement type, a highway mile marker number, a geolocation, a device ID, a lane marker, a pavement type, a speed limit, and any combination thereof.

15. An Infrastructure-to-Vehicular (I2V) communication system, the system comprising:
a. a vehicle-mounted interrogation module comprising at least one RF interrogation antenna operatively coupled to a wireless microcontroller (MCU), the at least one RF interrogation antenna configured to produce an RF interrogation signal and to receive RF static and sensor data; and
b. an embedded hybrid-powered RFID sensor device comprising a sensing module operatively coupled to a power source via an RF-triggered load switching module, wherein:
  i. the RF-triggered load switching module comprises an energy-harvesting antenna coupled to a charge pump, the charge pump coupled to a low-leakage load switch, wherein the RF-triggered load switching module operatively couples the power source to the sensing module via the low-leakage load switch by receiving and rectifying the RF interrogation signal at the energy-harvesting antenna and boosting the rectified RF interrogation signal into a DC switch activation signal sufficient to close the low-leakage switch; and
  ii. the sensing module comprises an RF microcontroller (MCU) operatively connected to at least one sensor and a transmitting antenna, the RF microcontroller (MCU) configured to combine static data stored at the RF microcontroller (MCU) and sensor data collected from the at least one sensor to form the RF static and sensor data transmitted to the vehicle-mounted interrogation module via the transmitting antenna.

16. The system of claim 15, wherein:
a. the at least one sensor is selected from the group consisting of a temperature sensor, a traffic signal sensor, a structural condition sensor, and a road condition sensor; and
b. the stored static data comprising a pavement type, a highway mile marker number, a geolocation, a device ID, a lane marker, a pavement type, a speed limit, and any combination thereof.

* * * * *